Patented Dec. 26, 1933

1,941,243

UNITED STATES PATENT OFFICE 1,941,243

MANUFACTURE OF ARTIFICIAL CREAM

Arne Bergsvik and Ragnvald Hellerud, Oslo, Norway

No Drawing. Application April 23, 1930, Serial No. 446,787, and in Great Britain June 8, 1929

5 Claims. (Cl. 99—11)

This invention relates to the production of a synthetic cream rich in fat and having high whippable qualities.

It has previously been proposed to produce such a cream by injecting fat into milk but it has been found that in order to obtain a product which is stable it is necessary to employ finer orifices than have yet been used for this purpose i. e. orifices not greater than .4 mm. in diameter and to inject the fat at high pressure i. e. at not less than 130 atmospheres and preferably at 180 to 200 atmospheres. Furthermore it is necessary to have present water soluble proteins derived from the yolk of egg or the complete yolk, and to heat the mixture after the injection of the fat to a critical temperature which must not be less than 70° C.

The vegetable fat employed is earth nut oil hardened to a melting point of approximately 32° C. In order to obtain a whippable synthetic cream the fat content must be high i. e. not less than 25 per cent. The optimum whipping qualities are generally obtained with a fat content of between 34 and 43 per cent.

For certain purposes e. g. where the cream is to be served with fruits, sweets &c. it may be desirable to obtain a richer cream, say one containing from 43 to 45 per cent of fat, and this can be accomplished in a similar manner to that already described, but such cream though it will whip well, will not give on whipping so great an increase of volume as the cream above described.

The critical temperature varies somewhat with the condition of the milk. As taken from the cow 70° C. may suffice but if the milk is purified from mucus as is common with modern dairying 74° C. is usually necessary. This can be determined by drawing a sample of the milk and noting its stability, but in any case the temperature of 74° C. can be employed with safety and will suffice.

The following is given by way of example of the preparation of such product. 100 litres of fresh milk preferably with an acidity of less than 8 Soxlet Henkel is mixed with 1.35 kilograms of dried sprayed yolk of egg and 45 complete yolks and there is then injected 46 kilograms of earth nut oil the injection being performed at a pressure of 200 atmospheres.

The temperature at which the injection takes place may vary between considerable limits but it has been found that suitable temperatures are 40–60° C. for the milk and the same for the earth nut oil.

The product is then rapidly raised to a temperature of 85° C. and it is then rapidly cooled to approximately 2° C. and should be kept at this temperature for about 24 hours.

It has been found that for this purpose the most valuable portion of the egg yolk is the water soluble proteins and not the lecathine as has hitherto been generally supposed and an extract of such water soluble proteins can be used in place of the egg yolk, about 1 kilogram of such extract being used per hundred litres of milk.

What we claim is:—

1. The method of making a whippable synthetic cream rich in fat content which consists in adding water soluble proteins derived from egg yolk to milk; injecting therein, through an orifice of not more than .4 mm. and at a pressure of not less than 130 atmospheres, earth nut oil hardened to a melting point of approximately 32° C. and then heating the product to a temperature not less than 70° C.

2. The method of making a whippable synthetic cream rich in fat content which consists in adding egg yolk to milk; injecting therein, through an orifice of not more than .4 mm. and at a pressure of not less than 130 atmospheres, earth nut oil hardened to a melting point of approximately 32° C. and then heating the product to a temperature not less than 70° C.

3. In the method of making a whippable synthetic cream rich in fat by adding water soluble proteins from egg yolk to milk, injecting into the mixture through an orifice of not more than .4 mm. earth nut oil hardened to a melting point of approximately 32° C., and heating the product to a temperature of not less than 70° C., that step which consists in injecting the earth nut oil into the mixture at a pressure of not less than 180 atmospheres.

4. In the method of making a whippable synthetic cream rich in fat by adding egg albumen containing water soluble egg yolk proteins to milk; injecting therein through an orifice of not more than .4 mm. earth nut oil hardened to a melting point of approximately 32° C., at a pressure of not less than 130 atmospheres; and subsequently heating the product to a temperature of 70° C.; that step which consists in preparing the egg albumen as a mixture of dried yolk and fresh yolk.

5. In the method of making a whippable synthetic cream rich in fat by adding egg albumen containing water soluble egg yolk proteins and comprising dried and fresh egg yolk to milk; injecting therein through an orifice of not more than .4 mm. earth nut oil hardened to a melting point of approximately 32° C. at a pressure of not less than 130 atmospheres; and subsequently heating the product to a temperature of 70° C.; that step which consists in adding the dried egg yolk to the milk before the fresh yolk.

ARNE BERGSVIK.
RAGNVALD HELLERUD.